(12) United States Patent
Smith et al.

(10) Patent No.: US 8,311,515 B1
(45) Date of Patent: *Nov. 13, 2012

(54) SYSTEM, METHOD, AND DEVICE FOR INTELLIGENCE GATHERING AND POSITION TRACKING

(75) Inventors: Corey Smith, Austin, TX (US); Todd Dupriest, Lenexa, KS (US)

(73) Assignee: Sur-Tec, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,158

(22) Filed: May 7, 2012

Related U.S. Application Data

(63) Continuation of application No. 12/975,754, filed on Dec. 22, 2010, now Pat. No. 8,265,597, which is a continuation of application No. 12/574,177, filed on Oct. 6, 2009, now Pat. No. 7,873,349.

(51) Int. Cl.
*H04M 1/66* (2006.01)

(52) U.S. Cl. ........ 455/410; 455/411; 455/418; 455/419; 455/456.3; 455/550.1

(58) Field of Classification Search ............... 455/550.1, 455/566, 404.1, 404.2, 456.1, 456.2, 456.3, 455/456.4, 457; 340/566; 342/357
See application file for complete search history.

(56) References Cited

U.S. PATENT DOCUMENTS

| | | | |
|---|---|---|---|
| 5,875,398 A | 2/1999 | Snapp | |
| 6,199,045 B1 | 3/2001 | Giniger et al. | |
| 6,480,726 B1 | 11/2002 | Sato et al. | |
| 7,016,656 B2 | 3/2006 | Odashima et al. | |
| 7,054,666 B2 | 5/2006 | Shibuya | |
| 7,149,533 B2 | 12/2006 | Laird et al. | |
| 7,181,252 B2 | 2/2007 | Komsi | |
| 7,259,781 B2 | 8/2007 | Koreki et al. | |
| 7,363,029 B2 | 4/2008 | Othmer | |
| 7,502,797 B2 | 3/2009 | Schran et al. | |

(Continued)

FOREIGN PATENT DOCUMENTS

FR   2899759   10/2007

(Continued)

OTHER PUBLICATIONS

Updated Accelerated Examination Support Document; Jul. 6, 2010; U.S. Appl. No. 12/574,177, filed Oct. 6, 2009.
Non-Final Rejection dated Apr. 15, 2010; Paper No. 20100401; U.S. Appl. No. 12/574,177, filed Oct. 6, 2009.

(Continued)

*Primary Examiner* — Kathy Wang-Hurst
(74) *Attorney, Agent, or Firm* — Hovey Williams LLP

(57) ABSTRACT

A mobile communication device that may be used by an investigator to secretly record a suspect and track the investigator's location includes a microphone for detecting sounds, a communication component for transmitting signals or data representative of the sounds to one of the portable computers via the wireless communication network, a display for displaying information related to operation of the device, a computing device, and a computer program implemented by the computing device. The computer program is operable to place the device in a stealth mode in which the display is turned off or otherwise deactivated to make the entire device appear to be turned off while the microphone continues to detect sounds and the communication component continues to transmit signals or data representative of the sounds to a surveillance or support team operating one of the portable computers.

20 Claims, 4 Drawing Sheets

U.S. PATENT DOCUMENTS

| | | | |
|---|---|---|---|
| 7,515,900 | B2 | 4/2009 | Van Camp |
| 7,873,349 | B1 | 1/2011 | Smith et al. |
| 2003/0032447 | A1 | 2/2003 | Bulthuis |
| 2003/0137426 | A1 | 7/2003 | Anthony et al. |
| 2003/0151501 | A1 | 8/2003 | Teckchandani et al. |
| 2005/0085257 | A1 | 4/2005 | Laird et al. |
| 2005/0255826 | A1 | 11/2005 | Wittenburg et al. |
| 2005/0272410 | A1 | 12/2005 | Chen |
| 2005/0282504 | A1 | 12/2005 | Yeh |
| 2007/0047696 | A1 | 3/2007 | Chen |
| 2007/0082700 | A1 | 4/2007 | Landschaft et al. |
| 2007/0140644 | A1 | 6/2007 | Gabara |
| 2007/0202858 | A1 | 8/2007 | Yu |
| 2008/0076410 | A1 | 3/2008 | Beyer |
| 2008/0224884 | A1 | 9/2008 | Kennedy |
| 2009/0093277 | A1 | 4/2009 | Lee et al. |
| 2009/0100384 | A1 | 4/2009 | Louch |
| 2009/0191913 | A1 | 7/2009 | Jones |
| 2009/0210249 | A1 | 8/2009 | Rasch-Menges et al. |
| 2009/0309725 | A1 | 12/2009 | Berger et al. |
| 2009/0322595 | A1 | 12/2009 | Mizukami |
| 2010/0009674 | A1 | 1/2010 | Sapkota et al. |
| 2010/0035630 | A1 | 2/2010 | Bosnjakovic et al. |
| 2010/0130178 | A1 | 5/2010 | Bennett et al. |
| 2010/0291906 | A1 | 11/2010 | DeLuca et al. |
| 2012/0033081 | A1 | 2/2012 | Smith et al. |

FOREIGN PATENT DOCUMENTS

| | | |
|---|---|---|
| JP | 2006041889 | 2/2006 |

OTHER PUBLICATIONS

Amendment filed in response to Non-Final Rejection dated Apr. 15, 2010; pp. 1-23; U.S. Appl. No. 12/574,177, filed Oct. 6, 2010.

Final Rejection dated Jun. 3, 2010; Paper No. 20100524; U.S. Appl. No. 12/574,177, filed Oct. 6, 2010.

Amendment filed in response to Final Rejection dated Jun. 3, 2010; pp. 1-18; U.S. Appl. No. 12/574,177, filed Oct. 6, 2009.

Non-Final Rejection dated Sep. 24, 2010; Paper No. 20100920; U.S. Appl. No. 12/574,177, filed Oct. 6, 2009.

Amendment filed in response to Non-Final Rejection dated Sep. 24, 2010; pp. 1-17; U.S. Appl. No. 12/574,177, filed Oct. 6, 2009.

Amendment filed in response to Non-Final Rejection dated Jan. 10, 2012; pp. 1-15; U.S. Appl. No. 12/975,754, filed Dec. 22, 2010.

Title: FBI Taps cell phone mic as eavesdropping tool; Author Declan McCullagh; Source: http://www.zdnet.com/news/fbi-taps-cell-phone-mic-as-eavesdropping-tool/150467; Dated Dec. 1, 2006.

Title: Digi-Watcher Web Site; Source: http://web.archive.org/web/20070810075352/, http://www.digi-watcher.com/survellance_features.htm, http://www.digi-watcher.com/help/settings_general.htm.

Title: Stealthy video capturer: a new video-based spyware in 3G smartphones; Authors: Xu et al.; Source: Proceedings of the Second ACM Conference on Wireless Setwork Security, p. 69-78, 2009.

Non-Final Rejection dated Jul. 5, 2012; Paper No. 20120623; U.S. Appl. No. 12/497,181, filed Jul. 2, 2009.

Amendment filed in response to Non-Final Rejection dated Jul. 5, 2012; pp. 1-11; U.S. Appl. No. 12/497,181, filed Jul. 2, 2009.

SYSTEM, METHOD, AND DEVICE FOR INTELLIGENCE GATHERING AND POSITION TRACKING

RELATED APPLICATIONS

The present application is a continuation patent application and claims priority benefit, with regard to all common subject matter, of earlier-filed U.S. nonprovisional patent application titled "SYSTEM, METHOD, AND DEVICE FOR INTELLIGENCE GATHERING AND POSITION TRACKING," Ser. No. 12/975,754 filed Dec. 22, 2010, which is a continuation of and claims priority benefit to earlier-filed U.S. nonprovisional patent application titled "SYSTEM, METHOD, AND DEVICE FOR INTELLIGENCE GATHERING AND POSITION TRACKING," Ser. No. 12/574,177, filed Oct. 6, 2009. Therefore, U.S. patent application Ser. Nos. 12/975,754 and 12/574,177 are both hereby incorporated by reference into the present application.

BACKGROUND

The present invention relates to systems, methods, and devices for gathering intelligence data. More particularly, embodiments of the invention relate to a mobile communication device that may be used to secretly record conversations of a suspect or other person and track the person's location.

Law enforcement officers, intelligence agents, military personnel, and other investigators often engage in covert intelligence gathering missions during which suspects and other persons of interest are secretly recorded with microphones and radio frequency transmitters worn by the investigators. Unfortunately, such microphones and transmitters are difficult to hide, easy to detect, and often make undesirable sounds, especially when used in the vicinity of other wireless transmitters and receivers.

Surveillance or support teams working with investigators also often wish to track the locations of the investigators and/or the persons being monitored. This requires that the investigators carry separate GPS receivers or other devices, making it even more difficult to hide the surveillance equipment. Use of both hidden microphones/transmitters and GPS receivers is also expensive and cumbersome.

Accordingly, there is a need for improved intelligence gathering methods and devices.

SUMMARY

The present invention solves some of the above-described problems and provides a distinct advance in the art of intelligence gathering methods and devices.

Embodiments of the invention can be implemented in hardware, software, firmware, or a combination thereof. In one exemplary embodiment, the invention is implemented with at least one mobile communication device operated by an investigator or other person gathering intelligence information, one or more portable computers operated by members of a support team assisting the investigator, and one or more host computers for storing data and other information gathered by the mobile communication device and the portable computers. The mobile communication device, portable computers, and host computers may all communicate and exchange data and other information via a wireless network and/or a communications network.

One embodiment of the mobile communication device comprises a microphone for detecting sounds, an image capturing component for capturing video and/or still images, a communication component for transmitting signals or data representative of the sounds, video, and/or still images to one of the portable computers via the wireless communication network, a display for displaying information related to operation of the device, a computing device, and a computer program implemented by the computing device.

In accordance with one important aspect of the invention, the computer program is operable to place the mobile communication device in a stealth mode in which the display may be turned off or otherwise deactivated to make the entire device appear to be turned off while the microphone continues to detect sounds and the communication component continues to transmit signals or data representative of the sounds to one of the portable computers. If the investigator or anyone else attempts to turn the mobile communication device off while it is in the stealth mode, the computer program presents screen graphics that suggest the device is being turned off, but the components of the device necessary to gather and transmit intelligence data continue to run. This allows an investigator and support team to secretly record a person even though the mobile communication device is in plain view because the device appears to be turned off. While in the stealth mode, the mobile communication device may be used to make or receive phone calls or perform other functions, in which case the display will be turned on, so that no one but the investigator and others participating in the investigation will know the device is in the stealth mode or that the stealth mode even exists.

In some embodiments, the mobile communication device can only be placed in the stealth mode after the investigator enters valid user information and an authorized member of the support team enters and transmits to the device valid acknowledgment information. Likewise, the stealth mode can only be cancelled after the investigator enters valid user information and a member of the support team enters and transmits to the device valid acknowledgment information. In other embodiments, the investigator and/or the support team may be required to only enter a passcode to initiate the stealth mode. Both embodiments permit the mobile communication device to be used as a conventional mobile phone while not in the stealth mode and ensure that the person being monitored cannot disable the stealth mode.

The mobile communication device may also include a GPS receiver or other location-determining component for determining geographic locations of the device and may transmit data representative of the geographic locations to one of the portable computers along with the voice signals or data. This allows the support team to track the location of the investigator and person being monitored even when the device is in the stealth mode.

While in the stealth mode, the mobile communication device preferably transmits the voice data or signals and the location data using internet protocol (IP) data channels (e.g. TCP, UDP) rather than the wireless network's voice channels. This allows the transmissions to be more easily encrypted and less vulnerable to interception. Importantly, the mobile communication device transmits the voice data or signals in real-time so the support team may monitor the investigator's and suspect's conversations and other sounds as they occur. This enables the support team to immediately respond or otherwise react to any distress signals.

In other embodiments, one of the portable computers may be programmed to wirelessly transmit a gain control instruction to the mobile communication device, and the mobile communication device may be programmed to adjust a gain setting of its microphone in response thereto. This permits a surveillance team to monitor the recording of a suspect's conversations and other sounds and to adjust the mobile communication device's microphone gain to compensate for background noises, the distance between the investigator and the suspect, the suspect's voice level, and/or other factors.

The mobile communication device may also include a vibration element that vibrates the housing of the device in a conventional manner. One of the portable computers may be programmed to wirelessly transmit an alert signal to the mobile communication device that causes the device to activate its vibration element. The mobile communication device may be programmed to vibrate once in response to an alert signal that is sent when the support team believes the investigator is in immediate danger, twice in response to a different alert signal that is sent when the support team believes the intelligence gathering mission should be aborted, and three or more times in response to other alert signals.

The mobile communication device may also include resident memory for storing the voice signals or data and the location data. This allows the device to "store and forward" intelligence data in the event the mobile communication device and portable computers cannot communicate.

The mobile communication device may also be programmed to receive and store geographic coordinates corresponding to a geofence or other boundary and to wirelessly transmit an alert to one of the portable computers whenever the device enters or exits an area encompassed by the geofence. Similarly, the mobile communication device may be programmed to automatically switch to the stealth mode whenever the device enters or exits the area encompassed by the geofence.

In a particular embodiment of the invention, the mobile communication device is a GPS-enabled "smart-phone" such as the HTC Touch Pro™ that has been programmed to perform the functions described herein. Use of an otherwise conventional mobile phone that has been programmed in accordance with the present invention permits law enforcement agencies and other entities to implement intelligence gathering missions without purchasing expensive stand-alone surveillance equipment.

After an intelligence gathering session has been completed, all voice and location data gathered by the mobile communication device and portable computers is uploaded to the server computers via the communication network. The servers may then generate a report that contains an audio file of all recorded communications and other sounds, a location tracking file that contains geographical coordinates for the mobile communication device during the intelligence session, the investigator's identification information, the exact log-in and log-out times for the stealth mode, and electronic signatures of the investigator and one or more members of the support team. Authorized persons may then request copies of the report in electronic form or other form. The reports may be used for any permitted purposes including as evidence in investigations, trials, and/or other proceedings.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
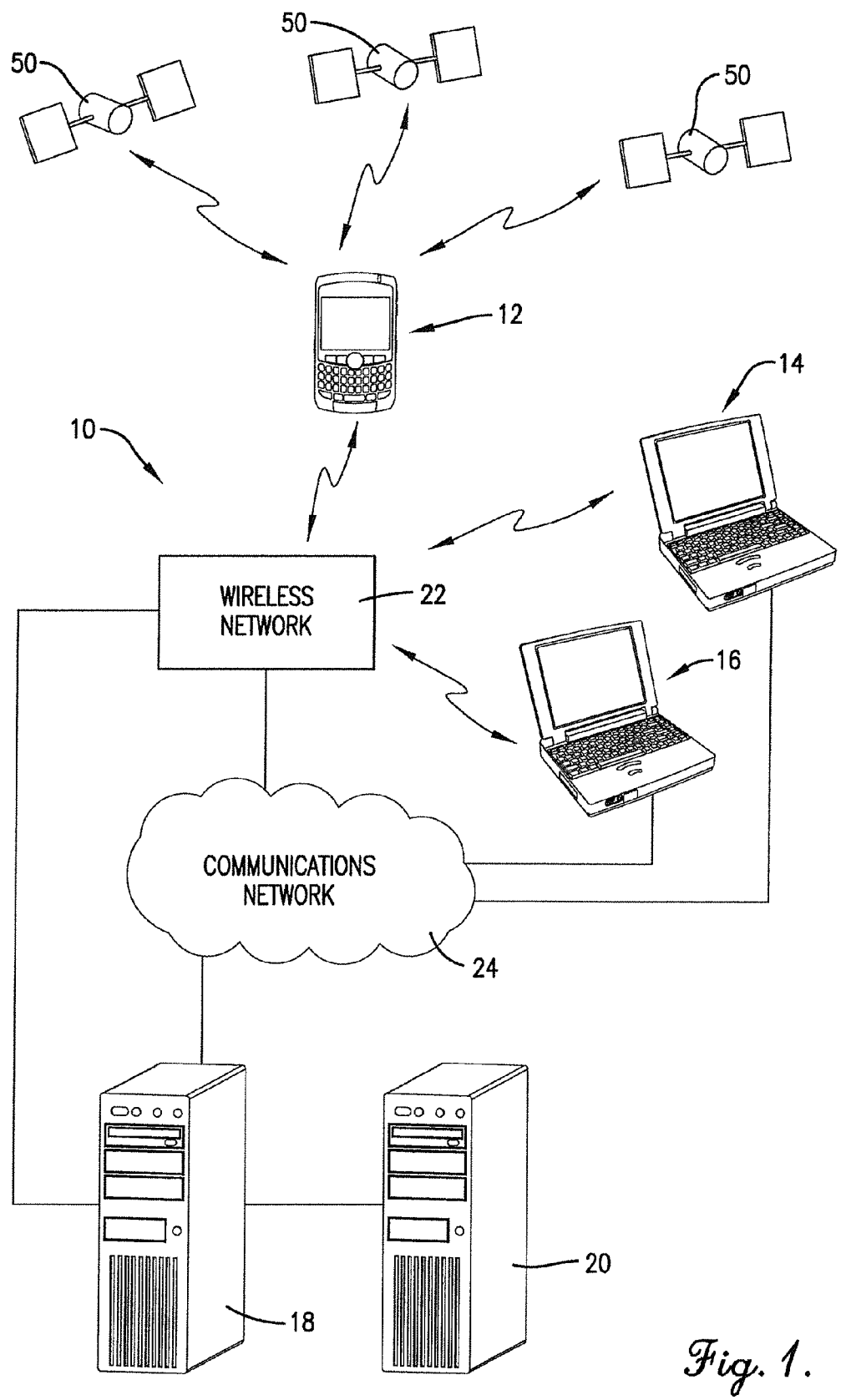
FIG. 1 is a schematic diagram of exemplary computer and communication equipment that may be used to implement embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the scope of the claims. The following detailed description is, therefore, not to be taken in a limiting sense. The scope of the present invention is defined only by the appended claims, along with the full scope of equivalents to which such claims are entitled.

The present invention relates to a system, method, and device for audio intelligence gathering and position tracking. Embodiments of the invention can be implemented in hardware, software, firmware, or a combination thereof. In one exemplary embodiment, the invention is implemented with one or more computer programs and computer and communications equipment broadly referred to by the numeral 10 in FIG. 1. The exemplary equipment 10 may include at least one mobile communication device 12, one or more portable computers 14, 16, and one or more host computers 18, 20, all of which may communicate and exchange data and other information via a wireless network 22 and/or a communications network 24. The computer programs and equipment 10 illustrated and described herein are merely examples of programs and equipment that may be used to implement embodiments of the invention and may be replaced with other programs and equipment without departing from the scope of the invention. Similarly, although FIG. 1 illustrates a particular number of mobile communication devices, portable computers, and host computers, any number of these devices may be used without departing from the scope of the invention.

The mobile communication device 12 may be used by a law enforcement officer, intelligence agent, military agent, or any other investigator wishing to gather intelligence information concerning a suspect or other monitored person. As used herein, "investigator" is meant to encompass any user of the mobile communication device 12, and "monitored person" and "suspect" are meant to encompass anyone being investigated and/or monitored by the investigator.

The mobile communication device 12 may be any device that can detect voice communications and other sounds and transmit and receive voice and data via the wireless network 22. The mobile communication device may be, for example, a wireless phone, a GPS-enabled wireless phone, a phone-enabled GPS device, a phone-enabled personal digital assistant (PDA), a phone-enabled MP3 device, or any other wireless communication device. In one particular embodiment, the mobile communication device 12 is an HTC Touch Pro™ communication device or equivalent device that has been programmed as described herein. The particular mobile communication device 12 and its components illustrated and described herein are merely examples of a device and components that may be used to implement aspects of the present invention and may be replaced with other devices and components without departing from the scope of the present invention.

Figure 2:
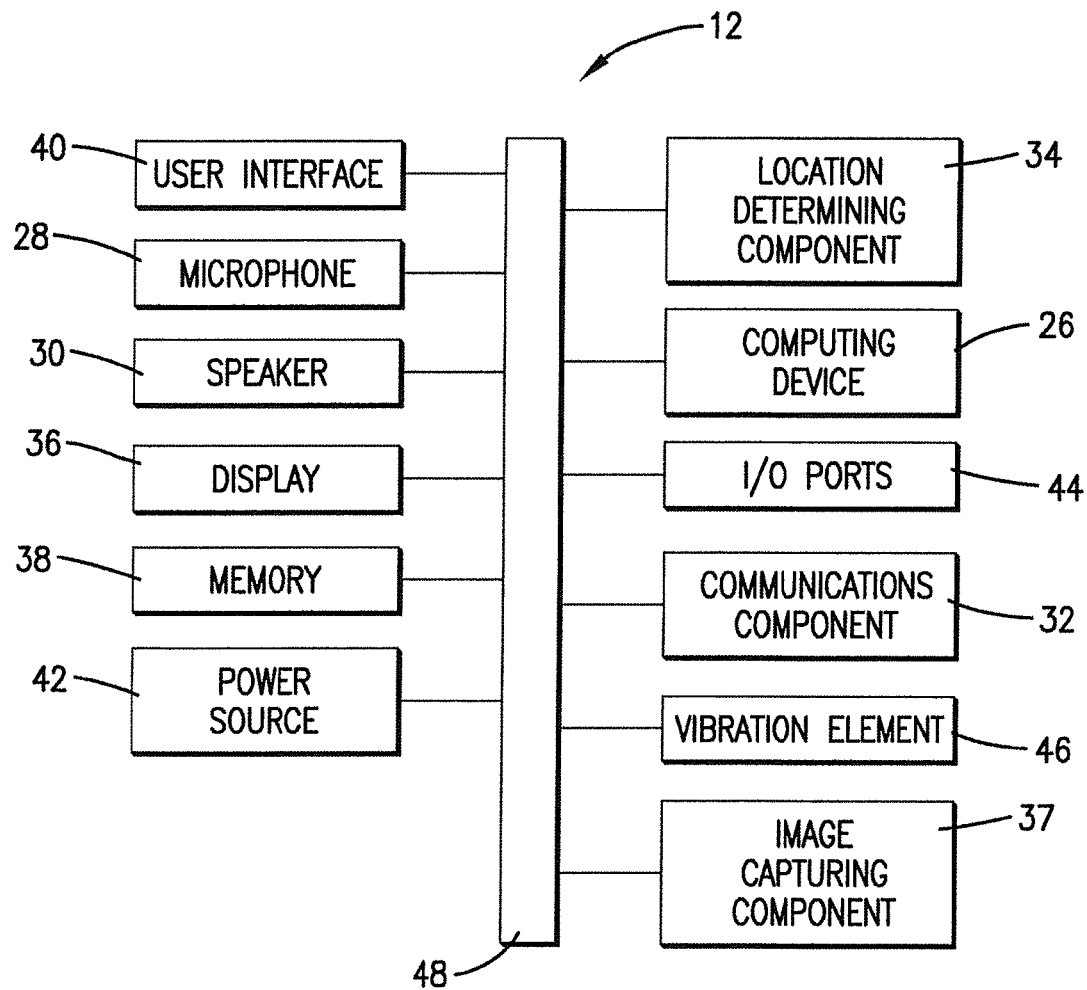
FIG. 2 is a block diagram illustrating selected components of a mobile communication device that may be used to implement embodiments of the invention.

Key components of the mobile communication device 12 are illustrated in FIG. 2 and include a computing device 26, a microphone 28, a speaker 30, a communications component 32, a location-determining component 34, a display 36, an image capturing component 37, memory 38, a user interface 40, a power source 42, one or more I/O ports 44, a vibration element 46, and a housing or enclosure.

The computing device 26 may include any number of processors, controllers, integrated circuits, programmable logic devices, or other computing devices and resident or external memory for storing data and other information accessed and/or generated by the device. In one embodiment, the computing device includes a Qualcomm® MSM7201A 528 MHZ processor with 512 MB of ROM, 288 MB of RAM, and Windows Mobile® 6.1 Professional Operating System. The computing device is preferably coupled with other components of the mobile communication device through wired or wireless connections, such as a data bus 48, to enable information to be exchanged between the various components.

The computing device 26 may implement a computer program and/or code segments to perform some of the functions described herein. The computer program may comprise an ordered listing of executable instructions for implementing logical functions in the computing device of the mobile communication device as described in more detail below.

The microphone 28 and speaker 30 are preferably built into the housing and are provided for detecting and reproducing voice communications and other sounds. As described in more detail below, the gain of the microphone and speaker may be manually adjusted by an operator of the mobile communication device or remotely adjusted by an operator of one of the computers.

The communications component 32 enables the device to communicate with the computers 14, 16 and other mobile phones and similar devices through the wireless network 22 and/or the communications network 24. The communications component may transmit and receive any communications including incoming and outgoing phone calls, IP data transmissions, text messages, instant messages, voicemail messages, e-mail messages, missed phone calls, and any other known communications. The communications component may communicate utilizing wireless data transfer methods such as cellular telephony, WiFi (802.11), Wi-Max, Bluetooth™, ANT®, ultra-wideband, infrared, radio frequency, etc. In one embodiment, the communications component is a cellular transceiver for transmitting and receiving communications over a cellular phone network such as those operated by Sprint®, AT&T®, Verizon®, and other companies. For example, the communications component 32 may transmit signals and/or data representative of sounds or audio detected by the microphone 28 to the portable computers 14, 16.

The communications component 32 may also include a Frequency Modulated (FM) receiver and may permit communications over several different networks. For example, the device may be operable to transmit and receive communications over a cellular network, a short-range FM radio network, and a WiFi network.

The location-determining component 34 determines locations of the device 12 as it is carried or otherwise moved from place to place and generates corresponding location data that may be transmitted to the computers or host computers as described below. In a particular embodiment, the location-determining component 34 is a satellite navigation receiver that works with a global navigation satellite system (GNSS) such as the global positioning system (GPS) primarily used in the United States, the GLONASS system primarily used in the Soviet Union, or the Galileo system primarily used in Europe. As shown in FIG. 1, a GNSS includes a plurality of satellites 50 in orbit about the Earth. The orbit of each satellite is not necessarily synchronous with the orbits of other satellites and, in fact, is likely asynchronous. The satellite navigation receiver receives spread spectrum satellite signals from the various satellites.

The spread spectrum signals continuously transmitted from each satellite 50 utilize a highly accurate frequency standard accomplished with an extremely accurate atomic clock. Each satellite, as part of its data signal transmission, transmits a data stream indicative of that particular satellite. The device 12 must acquire spread spectrum satellite signals from at least three satellites for its receiver to calculate its two-dimensional position by triangulation. Acquisition of an additional signal, resulting in signals from a total of four satellites, permits the device to calculate its three-dimensional position.

The location-determining component 34 and the computing device 26 are operable to receive navigational signals from the satellites 50 and to calculate positions of the device 12 as a function of the signals. The location-determining component and computing device may also determine track logs or any other series of geographic coordinates corresponding to points along a road or other path traveled by the investigator or other user of the device 12. The location-determining component 34 and/or the computing device may also calculate routes to desired locations, provide instructions to navigate to the desired locations, display maps and other information on the display screen, and execute other functions described herein.

The location-determining component 34 may include an antenna to assist in receiving the satellite signals. The antenna may be a patch antenna, a linear antenna, or any other type of antenna that can be used with navigational devices. The antenna may be mounted directly on or in the housing or may be mounted external to the housing.

The location-determining component 34 may include one or more processors, controllers, or other computing devices and memory so that it may calculate location and other geographic information without the computing device or it may utilize the components of the computing device. Further, the location-determining component may be integral with the computing device such that the location-determining component may be operable to specifically perform the various functions described herein. Thus, the computing device 26 and location-determining component can be combined or be separate or otherwise discrete elements.

Although embodiments of the mobile communication device 12 may include a satellite navigation receiver, it will be appreciated that other location-determining technology may be used. For example, the communication component 32 may be used to determine the location of the device by receiving data from at least three transmitting locations and then performing basic triangulation calculations to determine the relative position of the device with respect to the transmitting locations. For example, cellular towers or any customized transmitting radio frequency towers can be used instead of satellites 50. With such a configuration, any standard geometric triangulation algorithm can be used to determine the location of the electronic device.

In one embodiment, the mobile communication device 12 may use both a GPS receiver and cell tower triangulation to determine its position. For example, the device may first attempt to obtain a signal fix from at least three GPS satellites 50. If it is unable to do so due to blocked or otherwise unavailable satellite signals, it reverts to cell tower triangulation until satellite signals are received again. This allows the device 12 to be used inside buildings and other places where GPS devices do not always work.

In other embodiments, the location-determining component 34 need not directly determine the current location of the device. For instance, the location-determining component may determine the current geographic location through a communications network, such as by using Assisted GPS (A-GPS), or from another electronic device. The location-determining component 34 may even receive location data directly from the investigator or other user.

The display 36 is operable to display various information corresponding to the device and may comprise conventional black and white, monochrome, or color display elements including, but not limited to, Liquid Crystal Display (LCD), Thin Film Transistor (TFT) LCD, Polymer Light Emitting Diode (PLED), Organic Light Emitting Diode (OLED) and/or plasma display devices. Preferably, the display is of sufficient size to enable the user to easily view it while outdoors. In one particular embodiment, the display is a 2.8-inch TFT-LCD flat touch-sensitive screen with VGA resolution. The display 36 may be integrated with the user interface 40, such as in embodiments where the display is a touch-screen display to enable the user to interact with it by touching or pointing at display areas to provide information to the device.

The image capturing component 37 may comprise a camera or the like operable to capture video or still images. The image capturing component 37 may also comprise a flash to provide additional lighting while capturing still images. The image capturing component 37 may be communicably coupled with various other components of the mobile communication device 12 and may be configured for direct control via user interface 40 and/or remote control by the support team.

The memory 38 may be integral with the location-determining component 34, integral with the computing device 26, stand-alone memory, or a combination of both. The memory may include, for example, removable and non-removable memory elements such as RAM, ROM, Flash, magnetic, optical, USB memory devices, and/or other conventional memory elements.

The memory 38 may store various data associated with operation of the device 12, such as the computer program and code segments mentioned above, or other data for instructing the computing device and other device elements to perform the steps described herein. The memory may also be used to store data or signals representative of voices and sounds detected by the microphone 28 and the location data obtained by the location-determining component 34. This data may be stored as a back-up to the data transmitted to the computers 14, 16 or may serve as the primary storage when then mobile communication device cannot communicate with the computers. Further, the memory may store various cartographic data corresponding to geographic locations including map data, and map elements, such as terrain, alert locations, points of interest, geographic entities, and other navigation data to facilitate the various navigation functions provided by the device. Additionally, the memory may store destination addresses and previously calculated or otherwise acquired routes to various destination addresses for later retrieval by the computing device.

To implement functions and features of the present invention, the memory 38 or some other memory accessible by the computing device 26 may also store cartographic information for roads, buildings, or other structures. The cartographic information may be pre-loaded in the memory or other memory or may be downloaded to the device via the communication component 32 or I/O ports 44. For example, cartographic information for a particular road or set of roads may be downloaded to the device based on a current location of the device as determined by the location-determining component.

The various data stored within the memory may be associated within one or more databases to facilitate retrieval of the information. For example, the databases may be configured to enable the computing device to automatically access the cartographic information based upon a current geographic location of the device.

A map-matching search engine, preferably comprised of software, firmware or the like executed by the computing device 26, may search through the database of cartographic information to find known locations which match a series of geographical coordinates. A user may initiate a search or the search engine may automatically search the database based on a state of the device such as the current position of the device. The search engine, or alternatively a separate computation engine (also preferably comprised of software, firmware or the like executed by the computing device), may also perform calculations related to the cartographic information. The map mapping search engine may also identify a map location.

The user interface 40 permits a user to operate the device and is generally associated with the housing, such as by physical connection through wires, etc, or wirelessly utilizing conventional various wireless protocols. However, the user interface need not be physically coupled with the housing. In one embodiment of the device, the user interface includes a slide-out five-row QWERTY keyboard.

The user interface 40 may also comprise one or more functionable inputs such as buttons, switches, scroll wheels, a touch screen associated with the display, voice recognition elements such as a microphone, pointing devices such as mice, touchpads, trackballs, styluses, a camera such as a digital or film still or video camera, combinations thereof, etc. Further, the user interface may comprise wired or wireless data transfer elements such as removable memory including the memory, data transceivers, etc, to enable the user and other devices or parties to remotely interface with the device.

The user interface 40 may be operable to provide various information to the user utilizing the display or other visual or audio elements such as the speaker 30. Thus, the user interface enables the user and device to exchange information relating to the device, including geographic entities, configuration information, security information, preferences, route information, points of interests, alerts and alert notification, navigation information, waypoints, a destination address, etc.

In one embodiment of the invention, the user interface 40 may comprise a power button. The power button may be any of the one or more functionable inputs described above. The power button may be implemented in hardware, software, or any combination thereof. The power button may control whether or not the power source 42 provides power to the computing device 26, the microphone 28, the speaker 30, the communications component 32, the location-determining component 34, the display 36, the image capturing device 37, the memory 38, the user interface 40, and/or the vibration element 46. A user may touch, push, flip, or otherwise manipulate the power button in a particular manner to turn the mobile communication device 12 on and/or off. In some embodiments of the invention, the power button may be displayed as part of a touch screen display. In other embodiments of the invention, particular audible commands or signals received by the microphone 28 may actuate the mobile communication device 12 to turn off and/or on.

The power source 42 provides electrical power to the other components of the device and may comprise conventional power supply elements, such as batteries, battery packs, etc. The power source may also comprise power conduits, connectors, and receptacles operable to receive batteries, battery connectors, or power cables. For example, the power source may include both a battery to enable portable operation and a power input for receiving power from an external source such an automobile. In one embodiment, the power source is a rechargeable lithium-ion or lithium-ion polymer battery with a capacity of 1340MAh.

The I/O ports 44 permit data and other information to be transferred to and from the computing device 26 and the location-determining component 34. The I/O ports 44 may include a Secure Disk Digital (SD) card slot, Mini SD Card slot, Micro SD Card slot or the like for receiving removable SD cards, Mini SD Cards, Micro SD Cards, or the like, and a USB port for coupling with a USB cable connected to another computing device such as a personal computer. Navigational software, cartographic maps and other data and information may be loaded in the device via the I/O ports or the communications component.

To preserve battery life, the satellite navigation receiver or other location-determining component 34 may be switched off periodically. For example, the receiver may be alternatively switched on for 30 seconds, off for two minutes, then back on for 30 seconds. If the location-determining component determines the electronic device is moving, it may be switched on more frequently. Alternatively, the location-determining component may be turned on whenever the device enters or leaves a particular geographic area or perimeter such as a geofence. Additionally or alternatively, if the mobile communication device 12 is used in a GPS only mode, the investigator and/or the support team may select batch transit and then select a time duration. This may direct the mobile communication device 12 to collect location information, power up from a low power state, transmit the location information after the selected time duration, then return to a low power state.

The vibration element 46 may be any device capable of vibrating the device or a portion thereof. In one embodiment, the vibration element consists of a miniature motor with an offset weighted shaft.

The device's housing may be handheld or otherwise portable to facilitate easy transport of the device. The housing is preferably constructed from a suitable lightweight and impact-resistant material such as, for example, plastic, nylon, aluminum, or any combination thereof and may include one or more appropriate gaskets or seals to make it substantially waterproof or resistant. The housing may take any suitable shape for size, and the particular size, weight and configuration of the housing may be changed without departing from the scope of the present invention.

The portable computers 14, 16 may be laptop computers, personal computers, PDAs, smart phones, or any other devices capable of performing the functions described herein and are operated by surveillance team members or support personnel as discussed in more detail below. As used herein, "support team" is meant to encompass any person or groups of persons who may be assisting the investigator in an intelligence gathering mission. The portable computers 14, 16 are equipped with cellular communication components or other devices that enable them to transmit and receive voice and data via the wireless network 22 and/or communications network 24 and may also include location-determining components and associated software similar to the components and software in the mobile communication device. At least one of the portable computers 14, 16 may alternatively be mobile communication devices similar or identical to mobile communication device 12.

The host computers 18, 20 may serve as repositories for data and programs used to implement certain aspects of the present invention. The host computers may be any computing devices such as network or server computers and may be connected to a firewall to prevent tampering with information stored on or accessible by the computers. The functionality of the host computers may also be distributed amongst many different computers in a cloud computing environment.

The host computers 18, 20 may operate or host a private, secure website accessible only by authorized support team members and investigators. The host computers may include conventional web hosting operating software, an Internet connection such as a cable connection, satellite connection, DSL converter, or ISDN converter, and are assigned a URL and corresponding domain name so that the information hosted thereon can be accessed via the communication network in a conventional manner. The host computers may also host and support software and services of proprietary mobile application providers such as Google, Apple, and Blackberry.

Although two host computers 18, 20 are described and illustrated herein, embodiments of the invention may use any combination of host computers and/or other computers or equipment. For example, the features and services described herein may be divided between the host computers or may all be implemented with only one of the host computers.

The equipment 10 may also include a data interchange format device for distinguishing the types of devices (e.g. mobile phone, desktop computer) that attempt to access the host computers 18, 20 and for routing communications and requests to the host computers accordingly.

The wireless network 22 may be any communications network that permits wireless communications between the mobile communication device 12, the portable computers 14, 16, and other similar devices. In one embodiment, the wireless network is a cellular phone network such as those operated by Sprint®, AT&T®, Verizon®, and other companies. The cellular phone network may operate with GSM (Global System for Mobile communications), CDMA (Code Division Multiple Access), or any other known standards.

The communications network 24 is preferably the Internet but may be any other communications network such as a local area network, a wide area network, a wireless network, or an intranet. The communications network may also be a combination of several networks. In some embodiments of the invention, the mobile communication device 12 may be operable to connect to a secure server to re-broadcast audio, video, still images, and/or location data to multiple portable computers 14, 16 and/or host computers 18, 20.

The computer programs of the present invention are stored in or on computer-readable medium residing on or accessible by the mobile communication device 12, the portable computers 14, 16, and/or the host computers 18, 20 and preferably comprise ordered listings of executable instructions for implementing logical functions in the devices. The computer programs can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this application, a "computer-readable medium" can be any means that can contain, store, communicate, propagate or transport the program for use by or in connection with the instruction execution system, apparatus, or device. The computer-readable medium can be, for example, but not limited to, an electronic, magnetic, optical, electro-magnetic, infrared, or semi-conductor system, apparatus, device, or propagation medium. More specific, although not inclusive, examples of the computer-readable medium would include the following: an electrical connection having one or more wires, a portable computer diskette, a random access memory (RAM), a read-only memory (ROM), an erasable, programmable, read-only memory (EPROM or Flash memory), an optical fiber, and a portable compact disk read-only memory (CDROM).

The above-described equipment 10 may be used in covert intelligence gathering missions to monitor and record a suspect or other person of interest and track the person's locations. Specifically, the mobile communication device 12 may be used by an investigator, one or more of the portable computes 14, 16 may be used by support team members, and the host computer 18, 20 may be accessed by the investigator, support team members, or any other authorized persons. In accordance with one important aspect of the present invention, the mobile communication device includes a stealth mode in which its display may be turned off or otherwise deactivated to make the entire device appear to be turned off while its microphone continues to detect sounds and its communication component continues to transmit signals or data representative of the sounds to one of the portable computers.

For example, when the mobile communication device 12 is not in stealth mode, the power button may be actuated or manipulated to turn the mobile communication device 12 on and/or off, thereby either providing power to all powered components of the mobile communication device 12 or denying power to all powered components of the mobile communication device 12. However, in stealth mode, when the power button is actuated or manipulated to turn the mobile communication device 12 off, the computing device 26, the microphone 28, and the communications component 32 may not turn off, but the speaker 30 and the display 36 may turn off. Furthermore, in stealth mode, the location-determining component 34, the memory 38, and the vibration element 46 may continue to be provided with power even when the power button is actuated or manipulated in such a way as to turn the mobile communication device 12 off.

If the investigator or anyone else attempts to turn the mobile communication device off while it is in the stealth mode, the display presents screen graphics that suggest the device is being turned off but the components of the device necessary to gather and transmit intelligence data continue to run. This allows an investigator and support team to secretly record a person even though the mobile communication device is in plain view because the device appears to be turned off.

Graphics that suggest that the mobile communication device is being turned off may include, but are not limited to, brand logos, service provider logos, animated progress bars, and various other animated graphics. Some mobile communication devices may display a menu when a particular button or on-screen menu option is selected requesting further confirmation that the user desires to turn off the device. For example, the menu may present options of "turn off", "airplane mode", or "cancel". Furthermore, the mobile communication device may also supply an audible cue which suggests that the device is turning off. For example, some interrelated mobile communication devices, such as devices of the same brand, provide brand-specific graphics and sounds each time they are turned off, shut off, or powered down. Therefore, these visual and audio cues may be provided to the user when the investigator or anyone else attempts to turn the mobile communication device off, such that those being investigated believe that the mobile communication device is being turned off.

While in the stealth mode, the mobile communication device 12 may be used to make or receive phone calls, in which case the display will be turned on, so that no one but the investigator and others participating in the investigation will know the mobile communication device is in the stealth mode or that the stealth mode even exists. Additionally or alternatively, the mobile communication device 12 may be operable to block inbound calls and allow the investigator to enter another phone number for auto-forwarding of inbound calls.

The mobile communication device 12 can only be placed in the stealth mode after the investigator enters valid user information into the device and an authorized member of the support team enters valid acknowledgment information into one of the computers 14, 16 and transmits it to the mobile communication device. Likewise, the stealth mode can only be cancelled after the investigator enters valid user information and a member of the support team enters and transmits to the device valid acknowledgment information. This permits the mobile communication device to be used as a conventional mobile phone while not in the stealth mode and ensures that the person being monitored cannot disable the stealth mode.

The mobile communication device 12 may also transmit data representative of its locations to the portable computers 14, 16 along with the voice signals or data. The transmitted location data may be cross-hatched or otherwise transmitted to the computers with the original satellite data to enable the data to be cross-referenced for authenticity purposes.

The mobile communication device 12 may be configured to simultaneously transmit both voice data and location data, just voice data, or just location data. In one embodiment, both the investigator and the support team must provide authorization if only voice data or only location data is to be transmitted. The computers 14, 16 may be programmed to map the location of the mobile communication device and provide directions to the mobile communication device in case the support team needs to quickly go to the investigator.

While in the stealth mode, the mobile communication device 12 preferably transmits the voice data or signals and the location data using internet protocol (IP) data channels rather than the wireless network's voice channels. This allows the transmissions to be more easily encrypted. For example, data feed may be end-to-end encrypted at 256 ssl. Importantly, the mobile communication device transmits the voice data or signals in real-time so the support team may monitor the investigator's and suspect's conversations and other sounds as they occur. This enables the support team to immediately respond or otherwise react to any distress signals. In some embodiments of the invention, a jitter buffer (not shown) may be connected with or incorporated into the portable computers 14, 16 and/or the mobile communication device 12 and may be configured to enable the support team to increase the buffer if the computers 14, 16 and/or the device 12 are in poor data connection areas, thereby ensuring uninterrupted audio and/or video transmission.

One or more of the portable computers 14, 16 may be programmed to wirelessly transmit a gain control instruction to the mobile communication device 12, and the mobile communication device may be programmed to adjust a gain setting of its microphone in response thereto. This permits a surveillance team to monitor the recording of a suspect's conversations and other sounds and to adjust the mobile communication device's microphone gain to compensate for background noises, the distance between the investigator and the suspect, the suspect's voice level, and/or other factors.

Additionally, the portable computers 14, 16 may be programmed to wirelessly transmit image capture instructions to the mobile communication device 12, and the mobile communication device may be programmed to capture video and/or still images via the image capturing component 37 in response thereto. This permits a surveillance team to visually monitor a suspect and/or the suspect's surroundings. In stealth mode, video may be collected continuously or may be collected when instructed by the support team remotely or the investigator directly. The support team may remotely instruct the image capturing component 37 to obtain and transmit still images to the portable computers 14, 16 as desired or at a particular frequency or time interval. During stealth mode, the flash is not operational and the mobile communication device 12 does not provide any audio or visual indication that the image capturing component 37 is in use.

One of the portable computers 14, 16 may also be programmed to wirelessly transmit an alert signal to the mobile communication device 12 that activates the device's vibration element. The mobile communication device may be programmed to vibrate once in response to an alert signal that is sent when the support team believes the investigator is in immediate danger, twice in response to a different alert signal that is sent when the support team believes the intelligence gathering mission should be aborted, and three or more times in response to other alert signals.

The mobile communication device may also include resident memory for storing the signals or data representative of the detected sounds and the location data. This permits gathered intelligence data to be stored locally on the mobile communication device and forwarded to the portable computers at a later time.

The mobile communication device 12 may also be programmed to receive and store geographic coordinates corresponding to a geofence or other boundary and to wirelessly transmit an alert to one of the portable computers 14, 16 whenever the device enters or exits an area encompassed by the geofence. Similarly, the mobile communication device may be programmed to automatically switch to the stealth mode whenever the device enters or exits the area encompassed by the geofence.

After an intelligence gathering session has been completed, all voice and location data gathered by the mobile communication device 12 and portable computers 14, 16 is uploaded to the host computers 18, 20 via the communication network 24. The servers may then generate a report that contains an audio file of all recorded communications and other sounds, videos, images, a location tracking file that contains geographical coordinates for the mobile communication device during the intelligence session, the investigator's identification information, the exact log-in and log-out times for the stealth mode, and electronic signatures of the investigator and one or more members of the support team. Authorized persons may then request copies of the report in electronic form or other form. The reports may be used for any permitted purposes including as evidence in investigations, trials, and/or other proceedings.

Figure 3:
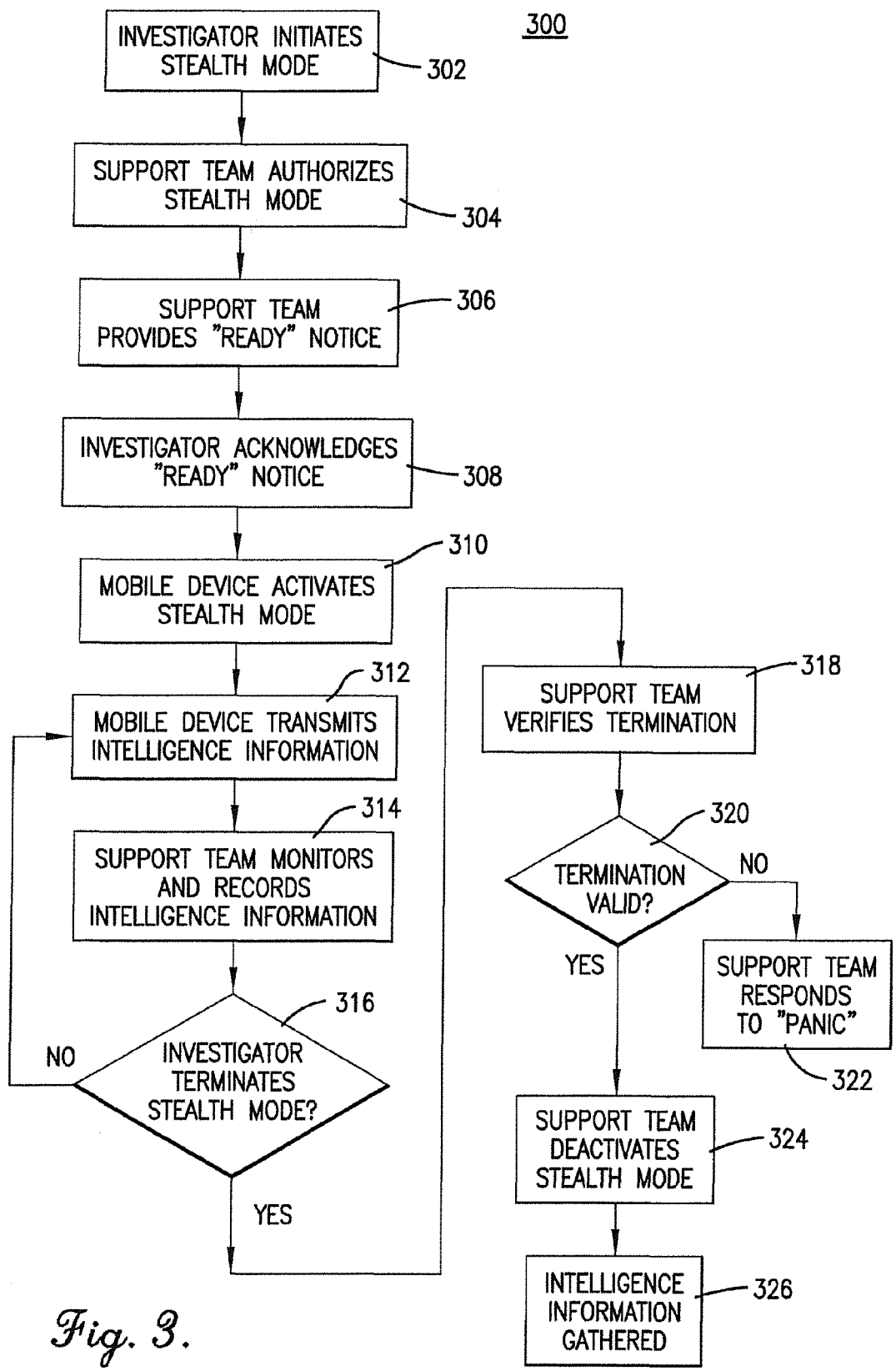
FIG. 3 is a flow diagram depicting a method in accordance with an embodiment of the invention.

The flow chart of FIG. 3 shows the functionality and operation of a preferred implementation of the present invention in more detail. Some of the blocks of the flow chart may represent a module segment or portion of code of the computer programs of the present invention which comprises one or more executable instructions for implementing the specified logical function or functions. In some alternative implementations, the functions noted in the various blocks may occur out of the order depicted in FIG. 3. For example, two blocks shown in succession in FIG. 3 may in fact be executed substantially concurrently, or the blocks may sometimes be executed in the reverse order depending upon the functionality involved.

As discussed above, the mobile communication device 12 may be used by an investigator and the portable computers 14, 16 may be used by members of a surveillance or support team working with the investigator. When the investigator and support team are ready to begin an intelligence gathering operation, the investigator first initiates the "stealth" mode on the mobile communication device as depicted in step 302.

To initiate the stealth mode, the investigator may be required to enter valid user information such as an identification number, an investigation case number, a password, etc. The investigator may also be prompted to acknowledge at least one party (the investigator) consents to recording of conversations in compliance with federal law.

In some embodiments, initiation of the stealth mode also requires the authorization of the support team as depicted in step 304. For example, the support team may be required to establish communications between one of the computers 14, 16 and the mobile communication device 12 via the wireless network and/or the communication network and then enter required identification information such as an identification number, an investigation case number, a password, etc. Once this information is entered into one of the portable computers, a notification may be sent to the mobile communication device to let the investigator know the support team is "in place" and ready to provide necessary support as depicted in step 306.

Initiation of the stealth mode may finally require the investigator to acknowledge or otherwise respond to the notification sent by the support team as depicted in step 308. Sending the acknowledgment may then automatically switch the mobile communication device to the stealth mode as depicted in step 310 so that the investigator and support team may begin to covertly detect and record voices and/or images of the investigator and a person being monitored.

While in the stealth mode, the mobile communication device 12 records voices and other sounds and secretly transmits signals or data representative of the detected sounds to at least one of the computers 14, 16 via the wireless network 22 as depicted in steps 312 and 314. The mobile communication device also receives signals from the satellites, determines its current location, and transmits signals or data representative of its current location to at least one of the computers so the support team may track the location of the investigator. The mobile communication device 12 may also collect and transmit video or still images with the image capturing component 37 and secretly transmit signals or data representative of the detected videos and/or images to at least one of the computers 14, 16 via the wireless network 22.

In one embodiment, the mobile communication device remains in the stealth mode until both the investigator and the support team request termination of the mode. The investigator may request termination of the stealth mode by entering valid user information such as an identification number, an investigation case number, a password, etc. as depicted in step 316. If the investigator enters incorrect information, the mobile communication device either remains in the stealth mode or may send an alert message to the support team. For example, in one embodiment, the investigator may indicate that he or she requires immediate back-up by entering a particular alert code and/or an electronic signature. This prompts the mobile communication device to send an alert message to the support team in accordance with the entered alert code. The mobile communication device may include multiple alert codes for different scenarios. For example, one alert code may request immediate back-up for an emergency situation whereas another alert code may simply indicate that the monitored person has left the scene but may be returning.

After the support team receives the investigator's request to terminate the stealth mode and verifies that no further intelligence gathering is required, the support team deactivates the stealth mode as depicted in steps 318, 320, and 324. If the support team determines the investigator did not properly terminate the stealth mode, the team may assume the mobile communication device is being operated by someone other than the investigator and/or that the investigator has signaled for help as depicted in step 322.

During or after an intelligence gathering session, the support team members and/or other authorized persons may monitor the voice communications and location information transmitted by the mobile communication device. This may be done by directly establishing a communication link to the mobile communication device through the wireless network or by accessing voice data and location data uploaded to one of the host computers 18, 20.

After an intelligence gathering session has been completed, all voice and location data gathered by the portable computers 14, 16 is uploaded to the host computers 18, 20 via the communication network 24 as depicted in step 326. The servers may then generate a report that contains an audio file of all recorded communications and other sounds, video, images, a location tracking file that contains geographical coordinates for the mobile communication device during the intelligence session, the investigator's identification information, the exact log-in and log-out times for the stealth mode, and electronic signatures of the investigator and one or more members of the support team. Authorized persons may then request copies of the report in electronic form or other form. The reports may be used for any permitted purposes including as evidence in investigations, trials, and/or other proceedings.

Figure 4:
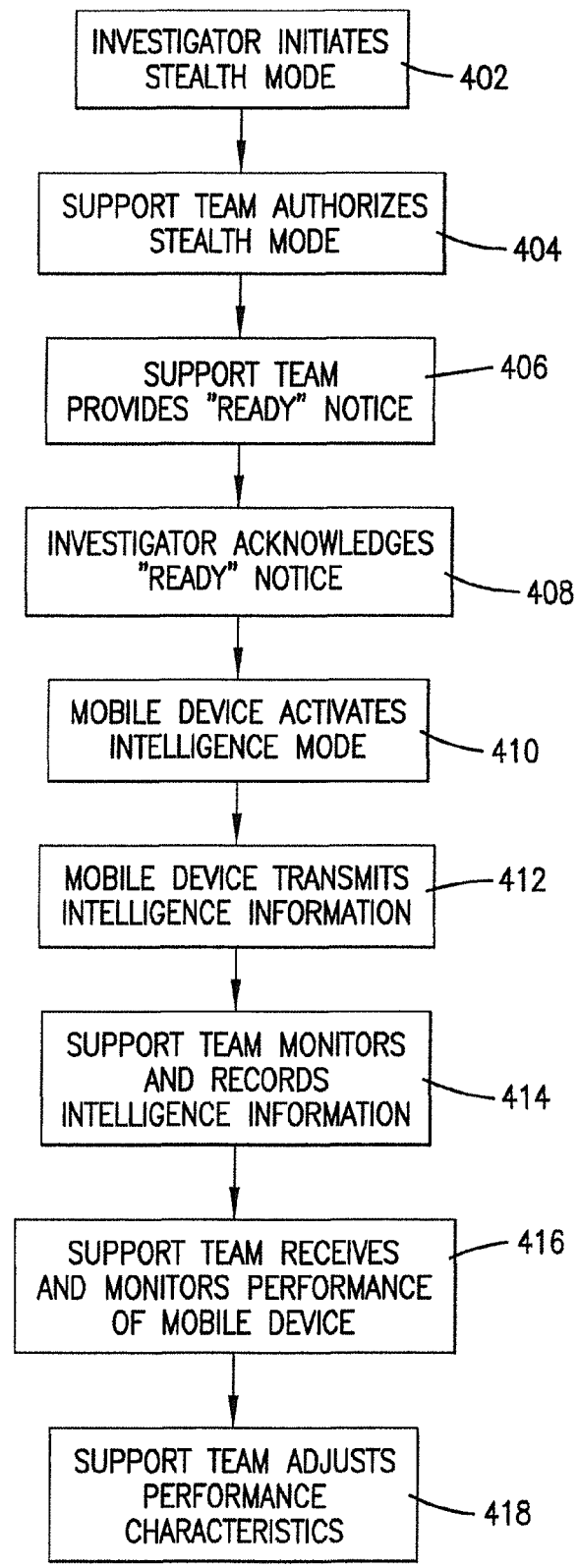
FIG. 4 is a flow diagram depicting a method in accordance with another embodiment of the invention.

The flow chart of FIG. 4 shows the functionality and operation of another preferred implementation of the present invention in more detail. As mentioned above, some of the blocks of the flow chart may represent a module segment or portion of code of the computer programs of the present invention which comprises one or more executable instructions for implementing the specified logical function or functions. In some alternative implementations, the functions noted in the various blocks may occur out of the order depicted in FIG. 4.

Steps 402 through 414 are substantially identical to steps 302 through 314 of FIG. 3. In step 416, a support team member operating one of the portable computers monitors the voices and other sounds transmitted by the mobile communication device 12. If the recorded voices are too low or otherwise difficult to understand, the support team member may instruct the portable computer to send a gain control instruction to the mobile communication device to increase the gain of the device's microphone as depicted in step 418. Likewise, if the detected voices are too loud or difficult to interpret because of too much background noise, the support team member may instruct the portable computer to send a gain control instruction to the mobile communication device to decrease the gain of the mobile communication device's microphone. Other operating characteristics of the mobile communication device may also be monitored and adjusted in this manner. For example, one of the portable computers may receive data from the mobile communication device representative of the mobile communication device's battery level, signal reception strength, and memory capacity and then permit a support team member to adjust operating characteristics of the mobile communication device and/or alert the investigator.

Although the invention has been described with reference to the preferred embodiment illustrated in the attached drawing figures, it is noted that equivalents may be employed and substitutions made herein without departing from the scope of the invention as recited in the claims.

Having thus described the preferred embodiment of the invention, what is claimed as new and desired to be protected by Letters Patent includes the following:

1. An intelligence gathering device comprising:
a microphone for detecting sounds;
a communication component for transmitting signals or data representative of the sounds to a computer via a wireless communication network;
a display for displaying information related to operation of the device;
a computing device operatively coupled with the microphone, the communication component, and the display; and
a computer program stored on a physical computer-readable medium accessible by the computing device, the computer program including a code segment to place the device in a stealth mode in which the display is operable to be turned off to make all components of the intelligence gathering device appear to be turned off while the microphone continues to detect sounds and the communication component continues to transmit signals or data representative of the sounds via internet protocol (IP) data channels to the computer,
wherein, in stealth mode, the microphone continuously detects sounds and the communication component continues to transmit signals or data representative of the sounds at all times, including: while the display is on and while the display is off.

2. The intelligence gathering device as set forth in claim 1, further comprising a user interface operable to be actuated to turn the intelligence gathering device off and on, wherein, in stealth mode, the microphone is operable to detect sounds and the communication component is operable to transmit signals or data representative of the sounds to the computer both when the user interface of the device is actuated to turn the device on and when the user interface is actuated to turn the device off.

3. The intelligence gathering device as set forth in claim 1, the computer program further including a code segment to wirelessly receive a gain control instruction from the computer and to adjust a gain setting of the microphone in accordance therewith.

4. The intelligence gathering device as set forth in claim 1, further including a vibration element configured for vibrating the device in response to an alert received by the communication component from the computer while the device is in stealth mode.

5. The intelligence gathering device as set forth in claim 1, the computer program further including a code segment operable to display graphics indicative of the device being in the process of turning off while the microphone continues to detect sounds and the communication component continues to transmit signals or data representative of the sounds when the device is in the stealth mode.

6. The intelligence gathering device as set forth in claim 1, further comprising the computer remotely located from the microphone, communication component, display, and computing device, configured for wirelessly receiving the signals or data representative of the sounds from the communication component.

7. The intelligence gathering device as set forth in claim 1, the computing device and the computer program being operable to do at least one of the following: place the device in the stealth mode and discontinue the stealth mode only after a user of the device enters valid user information and an operator of the computer enters and transmits to the device valid acknowledgment information.

8. The intelligence gathering device as set forth in claim 1, further including a location-determining component for determining a geographic location of the device, wherein the computer program includes a code segment to transmit data representative of the geographic location of the device to the computer while the device is in the stealth mode.

9. The intelligence gathering device as set forth in claim 1, further including an image capturing component for capturing at least one of video and still images, wherein the computer program includes a code segment to transmit data representative of the at least one of video and still images to the computer while the device is in the stealth mode.

10. The intelligence gathering device as set forth in claim 8, the computing device and the computer program being further operable to receive and store geographic coordinates corresponding to a geofence and to place the device in the stealth mode whenever the device enters or exits the area encompassed by the geofence.

11. The intelligence gathering device as set forth in claim 9, the computer program further including a code segment to wirelessly receive an image capture instruction from the computer and to capture a still image in accordance therewith.

12. A system for gathering intelligence data, the system comprising:
a mobile communication device comprising—
a microphone for detecting sounds;
a communication component for wirelessly transmitting signals or data representative of the sounds via a wireless communication network;
a display for displaying information related to operation of the mobile communication device;
a computing device operatively coupled with the microphone, the communication component, and the display; and
a computer program stored on a physical computer-readable medium accessible by the computing device, the computer program including a code segment to place the mobile communication device in a stealth mode in which the display is operable to turn off the display to make the mobile communication device appear to be turned off, wherein, in stealth mode, the microphone continuously detects sounds and the communication component continues to transmit signals or data representative of the sounds at all times, including: while the display is on and while the display is off; and
a computer configured for wirelessly receiving the signals or data representative of the sounds from the mobile communication device.

13. The system as set forth in claim 12, the computer being operable to wirelessly transmit a gain control instruction to the mobile communication device and the mobile communication device being operable to adjust a gain setting of the microphone in response to the gain control instruction.

14. The system as set forth in claim 12, the mobile communication device further comprising a user interface operable to be actuated to turn the mobile communication device off and on, wherein, in stealth mode, the microphone is operable to detect sounds and the communication component is operable to transmit signals or data representative of the sounds to the computer both when the user interface of the device is actuated to turn the mobile communication device on and when the user interface is actuated to turn the device off.

15. The system as set forth in claim 12, the mobile communication device further including an image capturing component for capturing at least one of video and still images, wherein the computer program includes a code segment to transmit data representative of the at least one of video and still images to the computer while the device is in the stealth mode.

16. The system as set forth in claim 12, the mobile communication device further including a location-determining component for determining a geographic location of the device, wherein the computer program includes a code segment to transmit data representative of the geographic location of the device to the computer while the device is in the stealth mode.

17. The system as set forth in claim 12, the computing device and the computer program being further operable to receive and store geographic coordinates corresponding to a geofence and to place the device in the stealth mode whenever the device enters or exits the area encompassed by the geofence.

18. The system as set forth in claim 12, wherein the communication component transmits signals or data representative of the sounds via internet protocol (IP) data channels to the computer.

19. The system as set forth in claim 15, the computer being operable to wirelessly transmit an image capture instruction to the mobile communication device and the mobile communication device being operable to capture a still image in accordance therewith.

20. A system for gathering intelligence data, the system comprising:
a mobile communication device comprising—
a microphone for detecting sounds;
an image capturing component configured for capturing at least one of video and still images;
a communication component for wirelessly transmitting signals or data representative of at least one of the sounds, video, and still images via a wireless communication network;
a display for displaying information related to operation of the mobile communication device;
a computing device operatively coupled with the microphone, the communication component, the display, and the image capturing component;
a user interface coupled with the microphone, the image capturing component, the communication component, the display, and the computing device, wherein the user interface includes a power button configured to turn the mobile communication device completely on or off when actuated in a normal operating mode of the mobile communication device; and
a computer program stored on a physical computer-readable medium accessible by the computing device, the computer program including a code segment to turn the mobile communication device completely off when the mobile communication device is in the normal operating mode and the power button is actuated to turn the mobile communication device completely off, and a code segment to switch the mobile communication device from the normal operating mode to a stealth mode in which the microphone continuously detects sounds and the communication component continues to transmit signals or data representative of the sounds both when the power button is actuated in an attempt to turn the mobile communication device on and when the power button is actuated in an attempt to turn the mobile communication device completely off, wherein, in stealth mode, the display is turned on when the power button is actuated in an attempt to turn the mobile communication device on and the display is turned off when the power button is actuated in an attempt to turn the mobile communication device off; and a computer configured for wirelessly receiving the signals or data representative of at least one of the sounds, video, and still images from the mobile communication device.

\* \* \* \* \*